Patented May 9, 1933

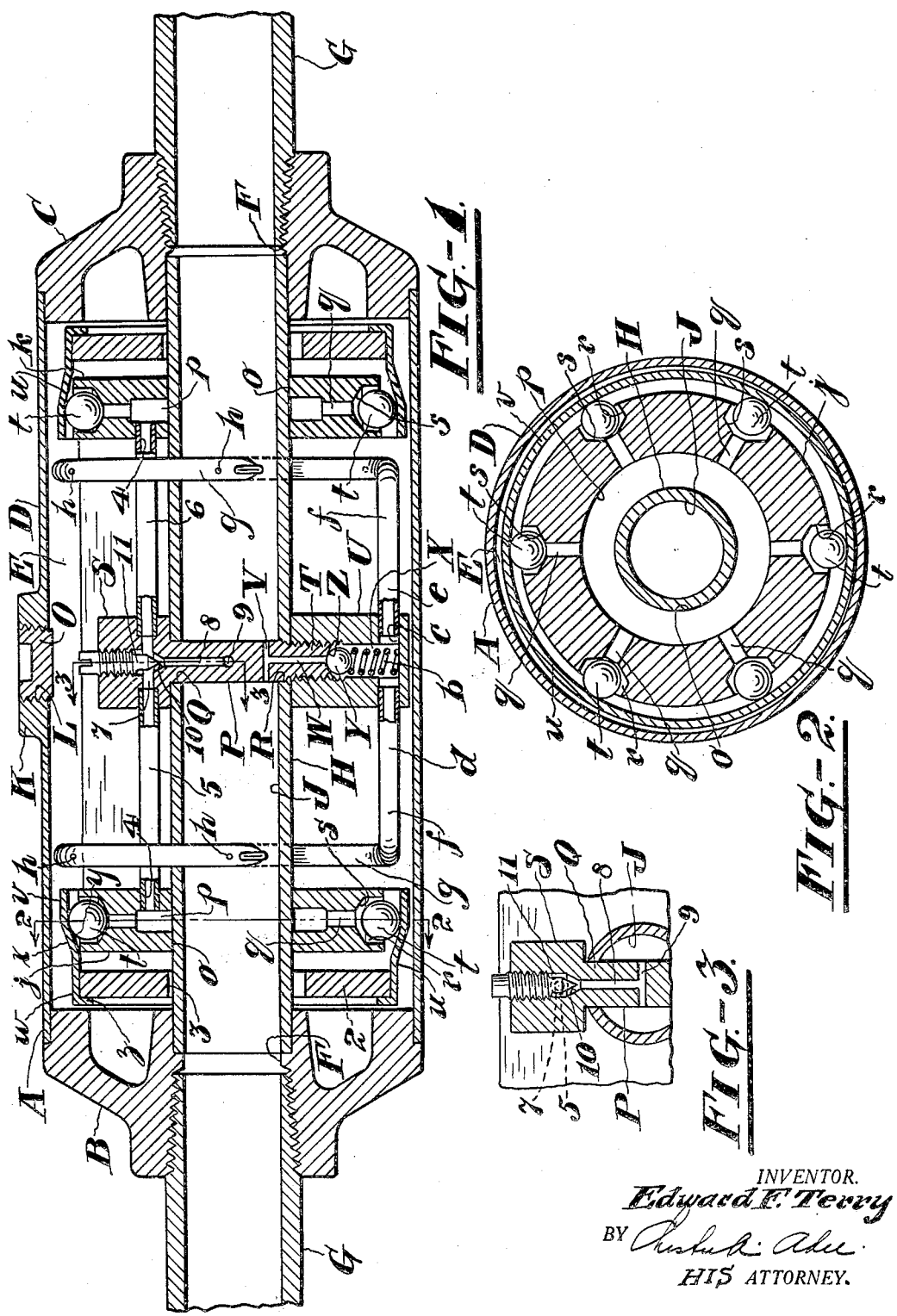

1,907,465

UNITED STATES PATENT OFFICE

EDWARD F. TERRY, OF PHILLIPSBURG, NEW JERSEY, ASSIGNOR TO INGERSOLL-RAND COMPANY, OF JERSEY CITY, NEW JERSEY, A CORPORATION OF NEW JERSEY

LUBRICATOR

Application filed June 4, 1931. Serial No. 542,044.

This invention relates to lubricators, but more particularly to lubricators of the type adapted to be attached to a supply line of a fluid actuated tool or mechanism and wherein the lubricant is conveyed to the cooperating surfaces of the movable parts by the pressure fluid.

One object of the invention is to assure a suitable supply of lubricant in an atomized state to the mechanism intended to be lubricated and in any of the positions which the lubricator may occupy in practice.

Other objects will be in part obvious and in part pointed out hereinafter.

In the drawing accompanying this specification and in which similar reference characters refer to similar parts, Figure 1 is a longitudinal sectional elevation of a lubricator constructed in accordance with the practice of the invention, Figure 2 is a transverse view taken through Figure 1 on the line 2—2 looking in the direction indicated by the arrows, and Figure 3 is a transverse view of a detail taken through Figure 1 on the line 3—3 looking in the direction indicated by the arrows.

Referring more particularly to the drawing, A designates generally a lubricator comprising end heads B and C and an intermediate casing section D, the interior of which serves as a reservoir E for lubricant.

The heads B and C are provided with suitable bores F having their outer ends threaded for connection to pipes or conduits G which constitute a pressure fluid supply line, such as is commonly used for conveying pressure fluid from a source of supply to the machine intended to be operated. A connection through the lubricator and between the constituent members of the supply line G is provided in the form of a tubular member or pipe H shown in this instance as extending coaxially through the reservoir E and seated with its ends in the bores F of the heads B and C. The interior of the pipe H thus forms a passageway J through which pressure fluid flows from one section of the pipe G to the other. The ends of the pipe H are preferably fitted snugly into the heads B and C to prevent unauthorized leakage of pressure fluid into the reservoir E.

On the casing D is a boss K having a threaded opening L through which lubricant may be introduced into the reservoir E and said opening is normally sealed by a filler plug O.

The means whereby pressure fluid is conveyed into the reservoir E to exert a pressure on the lubricant therein comprises a nozzle member P which extends through bores Q and R in opposite sides of the pipe H and thus through the passageway J. The nozzle member P preferably carries at one end a head S which may seat on the side of the pipe H. The opposite end T of the nozzle member which projects into the reservoir E is threaded to receive a nut U which may be threaded tightly against the outer surface of the pipe H to maintain both itself and the nozzle member P in the correct assembled positions.

In the nozzle P is a transverse pasasge V which, in the assembled position of the nozzle, lies longitudinally of the pasageway J and opens on opposite sides of the nozzle. Owing to this arrangement pressure fluid may enter said passage at either end of the passage V, irrespective of the direction of air flow through the passageway J.

Leading from the passage V and extending longitudinally through the threaded end T of the nozzle is a branch passage W which opens into a recess X in the nut U. In the recess X, and which recess is of somewhat larger diameter than the passage W, is disposed a valve Y shown in this instance as being in the form of a ball which seats against a valve seat Z on the end of the nozzle P to control the flow of pressure fluid from the passage W into the recess X. A spring $b$ in the recess acts against the valve Y to press said valve to the seat Z.

In the nut U and preferably near the outer end thereof is a transverse bore $c$ which communicates with the recess X and has seated in the opposite ends thereof the ends of tubes $d$ and $e$. For the purpose of illustration the tubes $d$ and $e$ are shown as being of opposite hand but said tubes may be identical for all practical purposes. Each tube comprises a straight portion $f$ and a curved portion or coil $g$ arranged about the pipe H.

As a preferred form of construction the coils $g$ are of only slightly smaller diameter than the interior of the reservoir E. Each coil has a suitable number of small ports $h$ so spaced with respect to each other that, irrespective of the position of the lubricator, at least one port $h$ will lie above the surface of the lubricant to assure a pressure within the reservoir E and above the surface of the lubricant equal to that in the passageway J. Preferably the coils $g$ are located near the ends of the reservoir E so that not all of the ports $h$ will be immersed whenever the lubricator occupies an inclined position.

The means whereby the lubricant is conveyed from the reservoir E to the passageway J comprises a pair of plates $j$ and $k$ disposed in the opposite ends of the reservoir E and having bores $o$ to receive the pipe H whereto they may be affixed, as for instance, by press fitting. The plates $j$ and $k$ may be identical in their essential respects. Each plate is provided with an internal annular groove $p$ of which the outer surface of the pipe H may form the inner bounding surface. From the groove $p$ radiate a plurality of passages $q$, six being shown in the present instance, and said passages $q$ open with their outer ends into depressions or recesses $r$ in the periphery of the plates. At the juncture of the passages $q$ and the recesses $r$ are seating surfaces $s$ to accommodate valves $t$ in the form of balls whereby communication between the reservoir E and the passages $q$ is controlled.

In order to retain the valves $t$ in the recesses $r$ rings $u$ are disposed about the plates $j$ and $k$. The rings $u$ are of somewhat larger diameter than the plates so that they will be capable of some degree of lateral movement with respect to the plates. Each ring comprises enlarged and reduced cylindrical portions $v$ and $w$ respectively which are connected by an integral inclined portion $x$ the inner surface $y$ of which constitutes a cam surface adapted, in certain positions of the lubricator, to press the valves $t$ against their seats $s$.

At the free end of the small cylindrical portion $w$ of the ring is a lateral flange $z$ to form an abutment for a weight shown as being in the form of a ring 2, which is seated within the cylindrical portion $w$ to add weight to the ring $u$.

The ring 2 is preferably affixed in any suitable and convenient manner to the ring $u$ so that the two rings will move as a unit, and in the ring 2 is a bore 3 through which the pipe H extends. The bore 3 however is of larger diameter than the pipe H to avoid contact between the ring 2 and the said pipe.

In the inner ends of the plates $j$ and $k$ are bores 4 for the reception of tubes 5 and 6 which communicate with the grooves $p$ and seat with their opposite ends in the head S of the nozzle P. A passage 7 in the head S affords communication between the tubes 5 and 6 and has a branch passage 8 which extends longitudinally of the nozzle P and opens into a passage 9 extending transversely through the nozzle P. The opposite ends of the passage 9 open into the passageway J so that lubricant may be drawn from both ends of said passage 9 to mingle with the pressure fluid flowing through the passageway J.

At the juncture of the passages 8 and 7 is a seat 10 to accommodate a needle valve 11 threaded into the head S for controlling the flow of lubricant into the main passageway J.

The operation of the device is as follows: Upon the admission of pressure fluid into the supply line G and therefore into the passageway J, a portion of the pressure fluid will flow through the passages V and W and, unseating the valve Y, will flow through the tubes $d$ and $e$ and a port or ports $h$ into the reservoir E. With the lubricator A in positions approaching the horizontal the ball valves $t$ controlling the upwardly directed passages $q$ will drop upon their seats to close the passages $q$ adjacent thereto. The remaining ball valves $t$, that is, those valves associated with downwardly directed passages $q$ will then drop away from their seats $s$ to open the passages $q$ which they control, but will, of course, be held in close proximity thereto by the rings $u$ which will retain the ball valves $t$ within the recesses $r$. By seating upon the uppermost balls $t$, however, the rings $u$ will exert a pressure on the valves $t$ and, owing to their weight, the rings will assist in holding the uppermost valves tightly to their seats.

The lubricant entering the lowermost or open passages $q$ passes through the grooves $p$, the tubes 5 and 6 into the passage 7, then flows past the needle valve 11 and through the passages 8 and 9 and is drawn from the opposite ends of the passage 9 by the pressure fluid flowing through the main passageway J. By suitably adjusting the needle valve 11 a quantity of lubricant commensurate for immediate requirements may be introduced into the passageway J and such lubricant will then intermingle with the pressure fluid and be carried thereby, in a finely atomized state, to the mechanism intended to be lubricated.

This introduction of lubricant into the air stream may continue indefinitely and, as the supply of lubricant in the reservoir E decreases, pressure fluid flowing through the passages V and W will unseat the ball valve Y thence flow through the tubes $d$ and $e$ to assure a supply of pressure fluid on the surface of the lubricant equal to the pressure of the fluid flowing through the passageway J.

In practice the lubricator A is of course constantly being shifted from one position to the other and, being of cylindrical shape, said lubricator may rotate freely about its axis. Inasmuch as the plates *j* and *k* are affixed to the pipe H which itself is stationary with respect to the casing elements of the lubricator, different passages *q* may become active for supplying lubricant to the passageway J upon each shifting of the casing. Upon each turning of the lubricator the ball valves *t* associated with the passages shifted to a downwardly direction will fall away from their seats and other ball valves associated with upwardly directed passages will drop to their seats where they will be held by the rings *u*.

From the foregoing description it will be evident that in most normal positions, that is, in positions approaching the horizontal, lubricant will be supplied through a passage or passages in both of the plates *j* and *k*. However, inasmuch as the areas of communication between the reservoir E and the passageway J, and, therefore, the amount of lubricant which may be introduced into the passageway J, is controlled by the needle valve 11 only a constant amount of lubricant may be conveyed to the mechanism intended to be lubricated, no matter how many of the passages *q* may be open to communication with the reservoir E.

Owing to the fact that lubricators of the character described are at times required to assume a vertical position and in which case the lubricant will flow to one end of the reservoir E, it is desirable that the free and uncontrolled flow of pressure fluid directly from the uppermost coil *g* through the unimmersed passages *q* and communicating passages be prevented. When used in this position this undesirable condition is obviated by the ring *u* associated with the topmost plate, either *j* or *k*, depending upon the position of the lubricator. The ring *u* will then move downwardly and its inclined surface *y* will engage all the ball valves *t* and press said ball valves simultaneously to their seats *s*, thus preventing communication between the reservoir and the passages *q* which the valves control.

I claim:

1. A lubricator comprising a casing having a lubricant reservoir and a main passageway for pressure fluid, means for conveying pressure fluid from the passageway into the reservoir, lubricant delivery means in the reservoir having passages for conveying lubricant from the reservoir and being connected for delivering such lubricant into the passageway, individual valve means for controlling the passages, and means movable relatively to and encircling the lubricant delivery means to guide the said valve means.

2. A lubricator comprising a casing having a lubricant reservoir and a main passageway for pressure fluid, means for conveying pressure fluid from the passageway into the reservoir, a plurality of lubricant delivery means in the reservoir having radially arranged passages connected to deliver lubricant into the passageway, individual valves to control the outer ends of the passages, and rings encircling the lubricant delivery means and being movable longitudinally with respect thereto for simultaneously closing all the valves associated with one of the lubricant delivery means accordingly as one end of the casing is elevated above the other end.

3. A lubricator comprising a casing having a lubricant reservoir and a main passageway for pressure fluid, means for conveying pressure fluid from the passageway into the reservoir, a pair of lubricant delivery means one each of which is disposed in each end of the casing and having radially arranged passages connected to deliver lubricant into the passageway, valves to control the outer ends of the passages and being movable by gravity to open and close the passages, and means encircling the lubricant delivery means and being movable by gravity for simultaneously closing all the valves associated with a lubricant delivery means.

4. A lubricator comprising a casing having a lubricant reservoir and a main passageway for pressure fluid, means for conveying pressure fluid from the passageway into the reservoir, a pair of lubricant delivery means one each of which is disposed in each end of the casing and having passages connected to deliver lubricant into the passageway, valves to control the passages and being movable by gravitation to open and close the passages, and means cooperating with the lubricant delivery means for guiding the valves and being movable by gravity for simultaneously closing all the valves associated with the lubricant delivery means lying in the uppermost end of the reservoir accordingly as one end of the casing is elevated above the other end.

5. A lubricator comprising a casing having a lubricant reservoir and a main passageway for pressure fluid, means for conveying pressure fluid from the passageway into the reservoir, plates disposed fixedly in the ends of the reservoir and having radially extending passages connected to supply lubricant to the passageway, valves in the plates movable by gravity to close the passages lying above and to open the passages lying below the transverse median line of the reservoir, and rings to retain the valves in the plates and being movable by gravity for simultaneously closing all the valves associated with a plate accordingly as one end of the casing is elevated above the other end.

6. A lubricator comprising a casing having a lubricant reservoir and a main passageway for pressure fluid, means for introducing pressure fluid into the reservoir to exert a pressure on the lubricant therein, a pair of lubricant delivery means in the reservoir having ports and passages connected to deliver lubricant into the passageway, valves to control communication between the reservoir and the passages, and means movable by gravity to close all the valves associated with a lubricant delivery means located in the elevated end of the reservoir accordingly as one end of the casing is elevated above the other end.

7. A lubricator comprising a casing having a lubricant reservoir and a main passageway for pressure fluid, means for conveying pressure fluid from the passageway into the reservoir, plates disposed fixedly in the ends of the reservoir and having radially extending passages connected to supply lubricant to the passageway, valves in the plates movable by gravity to close the passages lying above and to open the passages lying below the transverse median line of the reservoir, and weighted rings to retain the valves in the plates and having inclined portions adapted to simultaneously close all the valves associated with one of the plates accordingly as one end of the casing is elevated above the other end.

In testimony whereof I have signed this specification.

EDWARD F. TERRY.